United States Patent
Sakai et al.

(10) Patent No.: US 10,384,966 B2
(45) Date of Patent: Aug. 20, 2019

(54) METHOD FOR REMOVING SCALE AND SCALE REMOVER IN STEAM GENERATING FACILITY

(71) Applicant: KURITA WATER INDUSTRIES LTD., Tokyo (JP)

(72) Inventors: Mizuyuki Sakai, Tokyo (JP); Yukimasa Shimura, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 21 days.

(21) Appl. No.: 15/115,493

(22) PCT Filed: Jan. 26, 2015

(86) PCT No.: PCT/JP2015/052012
§ 371 (c)(1),
(2) Date: Jul. 29, 2016

(87) PCT Pub. No.: WO2015/122264
PCT Pub. Date: Aug. 20, 2015

(65) Prior Publication Data
US 2017/0050873 A1    Feb. 23, 2017

(30) Foreign Application Priority Data
Feb. 13, 2014  (JP) .................. 2014-025459

(51) Int. Cl.
*C11D 3/37* (2006.01)
*C11D 7/26* (2006.01)
(Continued)

(52) U.S. Cl.
CPC ................ *C02F 5/10* (2013.01); *B08B 3/02* (2013.01); *B08B 3/022* (2013.01); *B08B 3/04* (2013.01);
(Continued)

(58) Field of Classification Search
CPC ... C11D 3/2082; C11D 3/3757; C11D 3/3765; B08B 3/02; B08B 3/022; B08B 3/04; B08B 3/041
(Continued)

(56) References Cited

U.S. PATENT DOCUMENTS

2002/0195583 A1   12/2002  Suzuki et al.
2018/0215637 A1   8/2018   Sakai et al.

FOREIGN PATENT DOCUMENTS

CA       863696 A      2/1971
CN       1068313 A     1/1993
(Continued)

OTHER PUBLICATIONS

"Ground water: Dealing with Iron Contamination", Daniel Ityel, p. 1-4, Jun. 2011. (Year: 2011).*
(Continued)

*Primary Examiner* — Gregory R Delcotto
(74) *Attorney, Agent, or Firm* — Manabu Kanesaka

(57) ABSTRACT

Provided are a method for removing scale and a scale remover that can efficiently remove scale deposited inside a boiler can or the like in an addition amount of chemicals permissible in terms of cost without corroding a boiler, particularly can efficiently remove scale deposited inside a boiler can even in a facility operated with feed water containing high-concentration iron. A method for removing scale deposited in a system of a steam generating facility, wherein polyacrylic acid having a weight-average molecular weight of more than 20,000 and 170,000 or less and/or a salt thereof is added to feed water of the steam generating facility. When the feed water contains iron, polymethacrylic acid having a weight-average molecular weight of more than 1,000 and 100,000 or less and/or a salt thereof is further added in combination.

6 Claims, 1 Drawing Sheet

(51) Int. Cl.
 *C02F 5/10*  (2006.01)
 *C11D 3/20*  (2006.01)
 *B08B 3/04*  (2006.01)
 *B08B 3/02*  (2006.01)
 *F22B 37/52* (2006.01)
 *C11D 11/00* (2006.01)
 *C08F 120/06* (2006.01)
 *C08L 33/02* (2006.01)
 *C23F 14/02* (2006.01)

(52) U.S. Cl.
 CPC ............ *B08B 3/041* (2013.01); *C08F 120/06* (2013.01); *C08L 33/02* (2013.01); *C11D 3/2082* (2013.01); *C11D 3/3757* (2013.01); *C11D 3/3765* (2013.01); *C11D 7/265* (2013.01); *C11D 11/0041* (2013.01); *C23F 14/02* (2013.01); *F22B 37/52* (2013.01); *C02F 2303/22* (2013.01)

(58) Field of Classification Search
 USPC ............... 510/218, 234, 245, 254, 477, 488; 134/22.12, 22.18, 34, 36, 42
 See application file for complete search history.

(56) References Cited

FOREIGN PATENT DOCUMENTS

| | | |
|---|---|---|
| CN | 1068801 A | 2/1993 |
| EP | 121631 * | 10/1984 |
| GB | 1433221 A | 4/1976 |
| JP | S59-189998 A | 10/1984 |
| JP | 563-65999 A | 3/1988 |
| JP | H04-193971 A | 7/1992 |
| JP | 2000-154996 A | 6/2000 |
| JP | 2008-006369 A | 6/2006 |
| JP | 2010-172816 A | 8/2010 |
| JP | 2013-22535 A | 7/2011 |
| JP | 2011-212591 A | 10/2011 |
| JP | 5800044 B2 | 10/2015 |
| WO | 2005/116296 A1 | 12/2005 |
| WO | 2013/058115 A1 | 4/2013 |
| WO | 2013/140913 A1 | 9/2013 |
| WO | 2014/162992 A1 | 10/2014 |

OTHER PUBLICATIONS

"Iron in Your Water Supply", Ed Maas, p. 1-5, Jun. 2004. (Year: 2004).*

"An Introduction to Water Chemistry in Freshwater Aquaculture", Buttner et al, p. 1-4, 1993. (Year: 1993).*

PCT/ISA/210, "International Search Report for International Application No. PCT/JP2015/052012".

Japanese Office Action of JP Application No. 2014-025459 dated May 19, 2015.

Europe Patent Office, "Search Report for European Patent Application No. 15748848.7," dated Jun. 30, 2017.

China Patent Office, "Office Action for Chinese Patent Application No. 201580008475.8," dated Sep. 29, 2018.

Ye, Y. et al., "工业用水处理技术 (第二版) (Industrial Water Treatment Technology (Second Edition))," Sep. 30, 2004, p. 284, Shanghai Science Popularization Press.

China Patent Office, "Office Action for Chinese Patent Application No. 201580008475.8," dated Mar. 18, 2019.

Daqing Oilfield Special Operation Safety Training Center, "Operation and Safety Technology of Industrial Broiler," May 31, 2013 p. 174, University of Petroleum Press, Dongying, China.

Li, P. et al., "Water Treatment and Water Quality Control of Power Plant," Sep. 30, 2012 p. 388-389, Electric Power Press, Beijing, China.

Indonesia Patent Office, "Office Action for Indonesian Patent Application No. P00201605346," dated May 6, 2019.

* cited by examiner

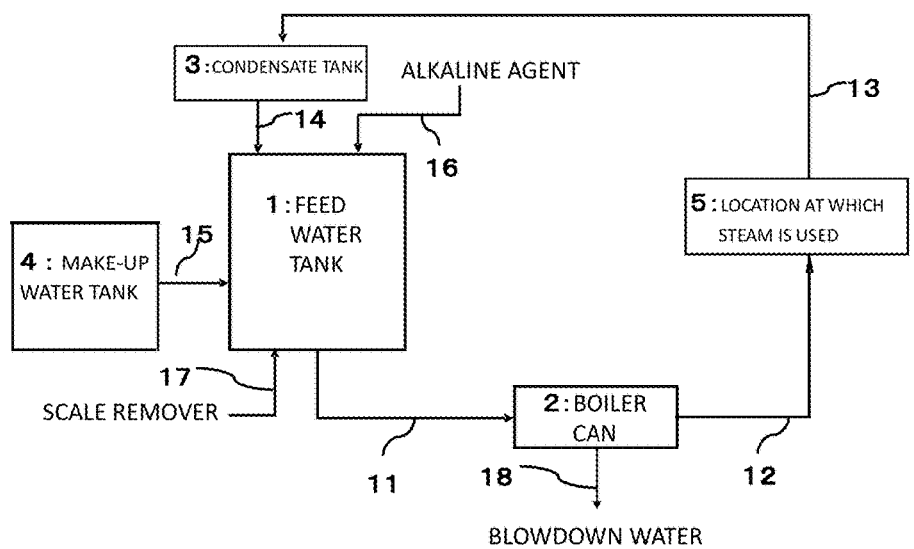

METHOD FOR REMOVING SCALE AND SCALE REMOVER IN STEAM GENERATING FACILITY

FIELD OF THE INVENTION

The present invention relates to a method for removing scale and a scale remover that can efficiently remove scale deposited inside a boiler can or the like in a steam generating facility.

BACKGROUND OF THE INVENTION

In recent years, water systems operated with high concentration by decreasing the amount of water blow-down to the outside of the system have been increasingly employed in order to reduce energy cost. Water in such water systems contains scale components including calcium, magnesium, silica, metal oxides or the like at high concentrations. Therefore, these components are deposited in a form of scale, which sometimes decreases thermal efficiency of heat exchangers and causes plugging.

In a boiler water system, scale components such as calcium, magnesium, silica, and iron brought into a boiler can form scale and are deposited on a heating surface with a high heat load. Those scale components have low thermal conductivity. Therefore, such scale causes tube failures by bulging, and burst due to overheating of boiler tubes made of steel.

Deposition of scale on a heating surface causes loss of heat transfer and decreases thermal efficiency of a boiler, which increases a fuel cost of a boiler. In a boiler water system or the like, calcium and magnesium, which are hardness components in raw water, are therefore removed with a water softener in order to prevent scale deposition, and softened water is used as feed water.

A water treatment method is also employed in which the deposition of scale components such as a trace amount of hardness components and silica in feed water, which are brought into a boiler can, in a system is suppressed by adding a scale inhibitor to boiler water, and these components are discharged to the outside of the system by performing blow-down.

A scale inhibitor inhibits formation of scale from hardness components brought into a water system. Examples of the scale inhibitor used include phosphates such as trisodium phosphate and sodium tripolyphosphate and polymers such as sodium polyacrylate.

Even when such a scale inhibition method is employed, for example, unexpected leakage of hardness components occurs in a feed water line, and scale may be deposited inside a boiler can. In this case, the boiler operation is stopped, the whole boiler water is discharged by performing blow-down, and then chemical cleaning is performed using a scale removing agent. Patent Literature 1 describes a method for removing scale by performing chemical cleaning that uses a chelating agent such as high-concentration ethylenediaminetetraacetic acid (EDTA) or an organic acid such as sulfamic acid.

The method for removing scale described in Patent Literature 1 poses problems in that the productivity is decreased because the boiler is temporarily stopped, and the cleaning cost is additionally required.

Patent Literature 2 proposes a method for removing scale without stopping the boiler operation. In the method proposed described in Patent Literature 2, a particular chelating agent such as EDTA, nitrilotriacetic acid (NTA), or diethylenetriamine and a particular disperser such as polymaleic acid are added to the boiler water, and scale is removed while the boiler is operated.

The chelating agent used in the method for removing scale in Patent Literature 2 acts on iron, which is a base material for the boiler, and thus corrosion occurs.

Patent Literature 3 proposes a method that uses a chelating agent and a corrosion inhibitor in a combined manner. In the method proposed in Patent Literature 3, the corrosion is suppressed by using a chelating agent and an aldonic acid or a salt thereof while at the same time scale is removed by using a chelating agent.

The method for removing scale in Patent Literature 3 poses problems in that the addition of the corrosion inhibitor is required in accordance with the amount of the chelating agent added, and the material cost for the corrosion inhibitor is additionally required.

Patent Literature 4 proposes a method for removing hardness scale without using a chelating agent. The method proposed in Patent Literature 4 uses a composition consisting of a mixture of a water-soluble anionic vinyl polymer sequestering agent and another water-soluble anionic vinyl polymer disperser. The agent contains at least 30 wt % of a carboxyl chelate functional unit. The agent has a chelation value of at least 200, and a molecular weight in the range of 500 to 50,000. It is described in Patent Literature 4 that when hardness components and iron are simultaneously brought into a water system, the addition of the sequestering agent and the disperser in high concentrations prevents the deposition of hardness scale and produces an effect of removing deposited scale.

However, an extremely large amount of chemicals need to be added to produce the effect of removing scale using the composition in Patent Literature 4, which poses a problem in terms of cost. Furthermore, when feed water contains hardness components at a low concentration and iron at a high concentration, the effect of removing scale decreases over time during operation, which poses a problem in that scale is not sufficiently removed.

Patent Literature 1: Japanese Patent Publication H4-193971 A

Patent Literature 2: Japanese Patent Publication 2000-154996 A

Patent Literature 3: Japanese Patent Publication 2011-212591 A

Patent Literature 4: Japanese Patent Publication S63-65999 A

SUMMARY OF INVENTION

In view of the foregoing, it is an object of the present invention to provide a method for removing scale and a scale remover that can efficiently remove scale deposited inside a boiler can or the like in an addition amount of chemicals permissible in terms of cost without corrosion of boiler material. It is another object of the present invention to provide a method for removing scale and a scale remover that can efficiently remove scale deposited inside a boiler can even in a facility operated with feed water containing high-concentration iron.

As a result of thorough studies to solve the above problems, the present inventors have found that scale deposited in a system can be efficiently removed by adding a small amount of polyacrylic acid and/or a salt thereof having a molecular weight in a particular range. As a result of further studies, the inventors have found that the above problems can be solved without decreasing the removal efficiency of scale by using polymethacrylic acid having a molecular weight in a particular range and/or a salt of the polymethacrylic acid in a combined manner, even in the case where iron is contained in feed water in a high concentration, such as the case where a steam condensate is recovered and reused as feed water or the case where a highly corrosive economizer is made of corrosive carbon steel.

The gist of the present invention is as follows.

[1] A method for removing scale deposited in a system of a steam generating facility, the method comprising: adding polyacrylic acid having a weight-average molecular weight of more than 20,000 and 170,000 or less and/or a salt of the polyacrylic acid to water in the steam generating facility or feed water of the steam generating facility.

[2] The method for removing scale in a steam generating facility according to [1], wherein the polyacrylic acid and/or the salt of the polyacrylic acid is added so that a concentration of the polyacrylic acid and/or the salt of the polyacrylic acid in water of a steam generating unit in the steam generating facility is 1 to 1,000 mg/L.

[3] The method for removing scale in a steam generating facility according to [1] or [2], wherein the feed water of the steam generating facility contains iron; and polymethacrylic acid having a weight-average molecular weight of more than 1,000 and 100,000 or less and/or a salt of the polymethacrylic acid is further added to the water in the steam generating facility or the feed water of the steam generating facility.

[4] The method for removing scale in a steam generating facility according to [3], wherein the polymethacrylic acid and/or the salt of the polymethacrylic acid is added so that a concentration of the polymethacrylic acid and/or the salt of the polymethacrylic acid in the water of the steam generating unit in the steam generating facility is 1 to 1,000 mg/L.

[5] The method for removing scale in a steam generating facility according to [3] or [4], wherein the polyacrylic acid and/or the salt of the polyacrylic acid and the polymethacrylic acid and/or the salt of the polymethacrylic acid are added so that a weight concentration ratio of the polyacrylic acid and/or the salt of the polyacrylic acid to the polymethacrylic acid and/or the salt of the polymethacrylic acid in the water of the steam generating unit in the steam generating facility is 1:100 to 100:1.

[6] A scale remover for removing scale deposited in a system of a steam generating facility, the scale remover comprising polyacrylic acid having a weight-average molecular weight of more than 20,000 and 170,000 or less and/or a salt of the polyacrylic acid; and polymethacrylic acid having a weight-average molecular weight of more than 1,000 and 100,000 or less and/or a salt of the polymethacrylic acid.

[7] The scale remover in a steam generating facility according to [6], wherein a weight ratio of the polyacrylic acid and/or the salt of the polyacrylic acid to the polymethacrylic acid and/or the salt of the polymethacrylic acid is 1:100 to 100:1.

ADVANTAGEOUS EFFECTS OF INVENTION

According to the present invention, scale deposited in a system can be efficiently removed during the operation of a steam generating facility without corrosion of the system by using a chemical in a relatively small amount without using a chelating agent. Furthermore, a high scale removing effect can be provided, even when iron is present in feed water in a high concentration.

BRIEF DESCRIPTION OF DRAWING

FIG. 1 is a system diagram illustrating an embodiment of a steam generating facility for carrying out the present invention.

DESCRIPTION OF EMBODIMENTS

Embodiments of the present invention will be described in detail below.

[Method for Removing Scale in Steam Generating Facility]

In the method for removing scale in a steam generating facility according to the present invention, scale deposited in a system of a boiler can, that is, a steam generating unit in a steam generating facility is removed by adding polyacrylic acid having a weight-average molecular weight of more than 20,000 and 170,000 or less and/or a salt of the polyacrylic acid (hereafter referred to as "polyacrylic acid (salt)") to water in the steam generating facility or feed water of the steam generating facility. When the feed water of the steam generating facility contains iron, polymethacrylic acid having a weight-average molecular weight of more than 1,000 and 100,000 or less and/or a salt of the polymethacrylic acid (hereafter referred to as "polymethacrylic acid (salt)") is preferably added in a combined manner.

FIG. 1 is a system diagram illustrating an embodiment of a steam generating facility for carrying out the present invention. The steam generating facility includes a feed water tank 1, a boiler can (steam generating unit) 2, a condensate tank 3, a make-up water tank 4, and a location 5 at which steam is used. Feed water in the feed water tank 1 is fed to the boiler can 2 through a feed water line 11. Steam generated in the boiler can 2 is fed to the location 5 at which steam is used through a steam line 12. Condensed water is circulated to the feed water tank 1 through a circulation line 13, the condensate tank 3, and a condensate line 14.

Make-up water in the make-up water tank 4 is supplied to the feed water tank 1 through a make-up water line 15. An alkaline agent is added to the feed water tank 1 through an alkaline agent addition line 16. A scale remover is added to the feed water tank 1 through a scale remover line 17. Blowdown water is discharged from the boiler can 2 through a blowdown line 18.

In FIG. 1, a scale remover containing polyacrylic acid (salt) or polyacrylic acid (salt) and polymethacrylic acid (salt) is added to feed water in the feed water tank 1. The scale remover may be added to the make-up water tank 4, the condensate tank 3, or the transfer line of each water system. The scale remover may also be added to two or more of such places. When the polyacrylic acid (salt) and the polymethacrylic acid (salt) are used in a combined manner, they may be added to different places or the same place. When the polyacrylic acid (salt) and the polymethacrylic acid (salt) are added to the same place, they may be mixed in advance and added or may be separately added. The same applies to other optional components described later.

Although FIG. 1 illustrates a circulation steam generating facility, the present invention is not limited to the circulation steam generating facility. The present invention can also be applied to a once-through steam generating facility and other steam generating facilities.

Examples of the feed water of the steam generating facility include water obtained by treating raw water with a reverse osmosis membrane, water obtained by softening raw water, or water obtained by subjecting raw water to ion exchange.

The operating conditions of the steam generating facility are not particularly limited. The working pressure is preferably 0.2 to 4 MPa and more preferably 0.2 to 3 MPa. When the working pressure is lower than 0.2 MPa, the scale removing effect is not sufficiently produced. When the working pressure is higher than 4 MPa, polymers such as polyacrylic acid (salt) and polymethacrylic acid (salt) undergo pyrolysis, which decreases a scale removing effect.

Hereafter, description will be made on polyacrylic acid (salt) used as a scale removing component in the method for removing scale in the steam generating facility according to the present invention, polymethacrylic acid (salt) used together with the polyacrylic acid (salt), and other optional additional components that may be used together with these chemicals.

<Polyacrylic Acid (Salt)>

The polyacrylic acid is not particularly limited, and polyacrylic acid that satisfies the weight-average molecular weight described later can be employed. Examples of the polyacrylic acid salt include a sodium salt of the polyacrylic acid and a potassium salt of the polyacrylic acid. The polyacrylic acid salt can be produced by mixing polyacrylic acid with an alkali metal hydroxide such as sodium hydroxide or potassium hydroxide or an alkali metal carbonate such as sodium carbonate or potassium carbonate.

The weight-average molecular weight of the polyacrylic acid used in the present invention is more than 20,000 and 170,000 or less and preferably more than 50,000 and 120,000 or less.

When the weight-average molecular weight of the polyacrylic acid is less than 20,000, the scale removing effect is not sufficiently produced. Similarly, when the weight-average molecular weight of the polyacrylic acid is more than 170,000, the scale removing effect decreases.

In the case of the polyacrylic acid salt, it is sufficient that the weight-average molecular weight of polyacrylic acid serving as a base of the polyacrylic acid salt satisfies the above conditions.

The polyacrylic acid (salt) is preferably added in such an amount that the concentration in the water of the steam generating unit in the steam generating facility, that is, the concentration in the boiler water is 1 to 1,000 mg/L, in particular, 10 to 500 mg/L.

When the concentration of the polyacrylic acid (salt) in the boiler water is above the lower limit, the scale removing effect is easily produced. When the concentration is below the upper limit, the complication of a water discharge process due to an increase in COD is prevented, and good cost-effectiveness can be achieved.

Therefore, the polyacrylic acid (salt) is added to water in each place in accordance with the concentration ratio of the steam generating facility so that the concentration of the polyacrylic acid (salt) in the boiler water is within the above range.

The polyacrylic acid (salt) is preferably added in the form of an aqueous solution prepared using deionized water so as to have a concentration of 0.1 to 30 wt %, in particular, 0.5 to 10 wt %.

<Polymethacrylic Acid (Salt)>

When iron is contained in the feed water of the steam generating facility, polymethacrylic acid (salt) is preferably used together with the polyacrylic acid (salt).

In general, iron insoluble in water, such as iron hydroxide or iron oxide, is present in feed water in the form of a suspended solids. Iron soluble in water is dissolved in water and dissociated and is present in the form of iron ions.

When the concentration of such suspended iron and dissolved iron in feed water is more than 0.3 mg/L, in particular, when the concentration is as high as 0.4 to 5.0 mg/L, polymethacrylic acid (salt) is preferably used together with the polyacrylic acid (salt).

The polymethacrylic acid is not particularly limited, and polymethacrylic acid that satisfies the following weight-average molecular weight is preferably used. Examples of the polymethacrylic acid salt include a sodium salt of the polymethacrylic acid and a potassium salt of the polymethacrylic acid. The polymethacrylic acid salt can be produced by mixing polymethacrylic acid with an alkali metal hydroxide such as sodium hydroxide or potassium hydroxide or an alkali metal carbonate such as sodium carbonate or potassium carbonate.

The weight-average molecular weight of the polymethacrylic acid used in the present invention is 1,000 or more and 100,000 or less and more preferably 5,000 or more and 60,000 or less.

When the weight-average molecular weight of the polymethacrylic acid is less than 1,000, the iron scale or inhibition effect is sometimes not sufficiently produced. When the weight-average molecular weight of the polymethacrylic acid is more than 100,000, the effect decreases.

In the case of the polymethacrylic acid salt, it is sufficient that the weight-average molecular weight of polymethacrylic acid serving as a base of the polymethacrylic acid salt satisfies the above conditions.

The polymethacrylic acid (salt) is preferably added in such an amount that the concentration in the water of the steam generating unit in the steam generating facility, that is, the concentration in the boiler water is 1 to 1,000 mg/L, in particular, 10 to 500 mg/L.

When the concentration of the polymethacrylic acid (salt) in the boiler water is above the lower limit, the iron scale or inhibition effect is produced and the scale removing effect produced by the polyacrylic acid (salt) can be easily maintained. When the concentration is below the upper limit, the complication of a water discharge process due to an increase in COD is prevented, and good cost-effectiveness can be achieved.

Therefore, the polymethacrylic acid (salt) is added to water in each place in accordance with the concentration ratio of the steam generating facility so that the concentration of the polymethacrylic acid (salt) in the boiler water is within the above range.

To sufficiently produce a synergistic scale removing effect by using the polyacrylic acid (salt) and the polymethacrylic acid (salt) in a combined manner, the polyacrylic acid (salt) and the polymethacrylic acid (salt) are preferably added so that the weight ratio of the polyacrylic acid (salt) to the polymethacrylic acid (salt) in the boiler water is 1:100 to 100:1, in particular, 1:50 to 10:1.

The polymethacrylic acid (salt) is preferably added in the form of an aqueous solution prepared using deionized water so as to have a concentration of 0.1 to 30 wt %, in particular, 0.5 to 20 wt %.

<Optional Additional Component>

In the present invention, various additional components such as a pH adjuster (alkaline), an oxygen scavenger, a corrosion inhibitor, and a scale disperser may optionally be added in an effective amount at any place in the system of the steam generating facility as long as the object of the present invention is not impaired. These additional components can be used alone or in combination of two or more.

The pH of the boiler water is preferably 11.0 or more and is preferably 12.0 or less from the viewpoint of preventing corrosion in the boiler can and in the system of the steam generating facility. Examples of a method for adjusting the pH of the boiler water to 11.0 or more include a method in which an alkaline agent is added and a method in which the concentration ratio is adjusted by controlling the blowdown amount and/or the feed water amount. Among them, a method in which an alkaline agent is added is suitable from the viewpoint of easiness of pH adjustment.

Examples of the alkaline agent for pH adjustment include alkali metal hydroxides, alkali metal carbonates, alkali metal phosphates, and neutralizing amines.

Examples of the alkali metal hydroxide include sodium hydroxide, potassium hydroxide, and lithium hydroxide. Examples of the alkali metal carbonate include sodium carbonate and potassium carbonate. Examples of the alkali metal phosphate include trisodium phosphate and sodium hydrogen phosphate.

Examples of the neutralizing amine include monoethanolamine, cyclohexylamine, morpholine, diethylethanolamine, monoisopropanolamine, 3-methoxypropylamine, and 2-amino-2-methyl-1-propanol.

Among the alkaline agents, the neutralizing amine moves to the steam and condensate system, and therefore the addition of a neutralizing amine with a high concentration produces a bad odor in the steam and condensed water and excessively increases the pH of the steam condensate system. As a result, if a copper-based alloy is present in the system, corrosion of the metal may occur. Therefore, the alkaline agent is preferably an alkali metal hydroxide, an alkali metal carbonate, or an alkali metal phosphate and more preferably sodium hydroxide, potassium hydroxide, or sodium carbonate from the viewpoint of cost effectiveness.

These alkaline agents can be used alone or in combination of two or more.

As in the case of the scale remover, the alkaline agent is also preferably added to make-up water or feed water. In a circulation steam generating facility, the alkaline agent may be added to steam condensate.

To supply an appropriate amount of alkaline agent, the steam generating facility according to the present invention preferably includes pH measuring means on the upstream side of the boiler can and/or on the downstream side of the boiler can.

Examples of the oxygen scavenger include hydroxylamines such as hydrazine, carbohydrazide, and diethylhydroxylamine; N-amino heterocyclic compounds such as 1-aminopyrrolidine and 1-amino-4-methylpiperazine; hydroquinone; hydrolyzable and condensed tannins (tannic acid) and the salts thereof; erythorbic acid and ascorbic acid and the salts thereof; aldonic acids such as gluconic acid and α-glucoheptonic acid and the salts thereof; saccharides (monosaccharides and polysaccharides) such as glucose; and sulfurous acid-based substances such as sulfurous acid and metabisulfurous acid and the salts thereof. They may be used alone or in combination of two or more.

Examples of the corrosion inhibitor include polyvalent carboxylic acids such as succinic acid, citric acid, and malic acid, oxycarboxylic acid, and the salts of the foregoing. They may be used alone or in combination of two or more.

[Scale Remover for Steam Generating Facility]

The scale remover for the steam generating facility according to the present invention contains polyacrylic acid (salt) having a weight-average molecular weight of more than 20,000 and 170,000 or less, preferably more than 50,000 and 120,000 or less, and polymethacrylic acid (salt) having a weight-average molecular weight of more than 1,000 and 100,000 or less, preferably more than 5,000 and 60,000 or less. Preferably, the scale remover contains the polyacrylic acid (salt) and the polymethacrylic acid (salt) at a weight ratio of polyacrylic acid (salt):polymethacrylic acid (salt)=1:100 to 100:1. More preferably, the weight ratio is 1:50 to 10:1.

The scale remover of the present invention may optionally contain the above-described water treatment components such as a pH adjuster, an oxygen scavenger, a corrosion inhibitor, and a scale disperser as long as the object of the present invention is not impaired.

In the scale remover of the present invention, the polyacrylic acid (salt) and the polymethacrylic acid (salt) may be a single formulation or may be separately supplied.

As described above, the polyacrylic acid (salt) is normally used in the form of an aqueous solution prepared by dissolving the polyacrylic acid (salt) in deionized water so as to have a concentration of 0.1 to 30 wt %, in particular, 0.5 to 15 wt %. The polymethacrylic acid (salt) is normally used in the form of an aqueous solution prepared by dissolving the polymethacrylic acid (salt) in deionized water so as to have a concentration of 0.1 to 30 wt %, in particular, 0.5 to 20 wt %.

EXAMPLES

Hereafter, the present invention will be more specifically described based on Examples and Comparative Examples, but the present invention is not limited to Examples.

In Examples and Comparative Examples below, when artificially synthetic raw water used as feed water was prepared, $CaCl_2$ was used for Ca hardness, $MgCl_2$ was used for Mg hardness, $Na_2SiO_3$ was used for silica, and $FeCl_2$ was used for Fe.

Test Example I

Examples I-1 to I-6 and Comparative Examples I-1 to I-3

The following scale removing test was performed under the following conditions using the test equipment and feed water below to evaluate the scale removing effect of polyacrylic acid and polymaleic acid.

<Test Equipment>
Stainless test boiler (water quantity: 5 L)
<Feed Water>
Synthetic water A: synthetic water having a Ca hardness of 20 $mgCaCO_3$/L and a Mg hardness of 10 $mgCaCO_3$/L and containing silica with a concentration of 15 mg/L and sodium carbonate with a concentration of 30 mg/L
Synthetic water B: synthetic water containing silica with a concentration of 15 mg/L, polyacrylic acid or polymaleic acid with a concentration of 10 mg/L, which has a weight-average molecular weight listed in Table 1, and sodium carbonate with a concentration of 32 mg/L
<Test Conditions>
Feed water temperature: 40° C.
Working pressure: 2.0 MPa
Water feeding amount: 10 L/h
Concentration cycles: 10 times
Boiler water pH: 11.4
<Scale Removing Test>
Three heat transfer tubes (made of carbon steel, surface area: 200 $cm^2$) were weighed and recorded, and then inserted into the stainless steel-made test boiler.

A 60 mesh strainer having a diameter of 20 mm was installed in a blowdown line.

The stainless test boiler was operated for 24 hours while the synthetic water A was supplied under the conditions of pressure: 2.0 MPa, amount of evaporation: 9.0 L/h, blowdown amount: 1.0 L/h, and concentration cycles: 10 times. After the operation, the heat transfer tubes on which scale was deposited were taken out and weighed to calculate the scale deposition amount. Subsequently, the heat transfer tubes were inserted into the stainless test boiler again. The stainless steel-made test boiler was operated for three days under the same conditions using the synthetic water B to perform a scale removing process.

After the scale removing operation, the heat transfer tubes were taken out and weighed in the same manner to calculate the scale deposition amount. A scale removal percentage was calculated from the scale deposition amounts before and after the scale removing process.

The strainer after the completion of the test was observed to check the presence or absence of a deposit that may cause clogging of the strainer.

Table 1 shows the results.

TABLE 1

| | Scale remover ※ | | | |
|---|---|---|---|---|
| | Type | Weight-average molecular weight | Scale removal percentage (%) | Deposit on strainer |
| Comparative Example I-1 | PAA | 4,000 | 21 | Absence |
| Comparative Example I-2 | PMA | 21,000 | 35 | Presence |
| Comparative Example I-3 | PMA | 55,000 | 40 | Presence |
| Example I-1 | PAA | 21,000 | 42 | Absence |
| Example I-2 | PAA | 52,000 | 65 | Absence |
| Example I-3 | PAA | 75,000 | 71 | Absence |
| Example I-4 | PAA | 100,000 | 61 | Absence |
| Example I-5 | PAA | 120,000 | 54 | Absence |
| Example I-6 | PAA | 170,000 | 45 | Absence |

※ PAA: polyacrylic acid
PMA: polymaleic acid

<Consideration>

As is clear from Table 1, when the weight-average molecular weight of the polyacrylic acid is 20,000 or less, the scale removal percentage is low. When the weight-average molecular weight is more than 20,000 and 170,000 or less, the scale removal percentage is high. In particular, when the weight-average molecular weight is more than 50,000 and 120,000 or less, the scale removing effect is high.

In contrast, the polymaleic acid produced a scale removing effect to a certain degree. However, a viscous deposit was observed in the blowdown line strainer, and most of the strainer was covered with the deposit and clogging was about to occur. This was assumed to be due to a gelled material produced as a result of a reaction of hardness components and the polymaleic acid.

Test Example II

Examples II-1 to II-6 and Comparative Examples II-1 to II-11

The following scale removing test was performed under the following conditions using the test equipment and feed water below to evaluate the influence of the weight-average molecular weight of the polyacrylic acid and the combined use of the polymethacrylic acid on the scale removing effect.

<Test Equipment>

Stainless steel-made test boiler (water quantity: 5 L)

<Feed Water>

Synthetic water C: synthetic water having a Ca hardness of 40 mgCaCO$_3$/L and a Mg hardness of 20 mgCaCO$_3$/L and containing silica with a concentration of 30 mg/L, sodium carbonate with a concentration of 30 mg/L, and Fe with a concentration of 1 mg/L Synthetic water D: synthetic water containing silica with a concentration of 30 mg/L, polyacrylic acid with a concentration of 5 mg/L, which has a weight-average molecular weight listed in Table 2 and serves as a chemical 1, a substance listed in Table 2 with a concentration of 5 mg/L, which serves as a chemical 2, Fe with a concentration of 1 mg/L, and sodium carbonate with a concentration of 32 mg/L (the chemical 1 and the chemical 2 were not added in Comparative Example II-1 and the chemical 2 was not added in Comparative Examples II-2 to II-8)

<Test Conditions>

Feed water temperature: 40° C.

Working pressure: 0.7 MPa

Water feeding amount: 13 L/h

Concentration cycle: 10 times

Boiler water pH: 11.5

<Scale Removing Test>

Three heat transfer tubes (made of carbon steel, surface area: 200 cm$^2$) were weighed and recorded, and then inserted into the stainless steel-made test boiler.

The test boiler was operated for 21 hours while the synthetic water C was supplied under the conditions of pressure: 0.7 MPa, amount of evaporation: 11.7 L/h, blowdown amount: 1.3 L/h, and concentration cycle: 10 times. After the operation, the heat transfer tubes on which scale was deposited were taken out and weighed to calculate the scale deposition amount. Subsequently, the heat transfer tubes were inserted into the stainless test boiler again. The stainless test boiler was operated under the same conditions using the synthetic water D to perform a scale removing process. After the operation, the heat transfer tubes were taken out and weighed in the same manner to calculate the scale deposition amount. An amount of scale removed was calculated from the scale deposition amounts before and after the scale removing process. The amount of scale removed was evaluated by taking out and weighing the heat transfer tubes and inserting the heat transfer tubes again every three days. The scale removing process was performed for 9 days in total. The scale removal percentage after the scale removing process for 9 days (the ratio of the total amount of scale removed after 9 days to the amount of scale deposited at the beginning of the scale removing process) was calculated.

Table 2 shows the results.

TABLE 2

| | Scale remover ※ | | | | | | | | |
|---|---|---|---|---|---|---|---|---|---|
| | Chemical 1 | | | Chemical 2 | | | | | |
| | Type | Weight-average molecular weight | Concentration of chemical (mg/L-feed water) | Type | Weight-average molecular weight | Concentration of chemical (mg/L-feed water) | Amount of scale removed (mg) | | Scale removal percentage (%) |
| | | | | | | | 0-3 days | 3-6 days | 6-9 days | |
| Comparative Example II-1 | Blank | — | — | — | — | — | 20 | 10 | 10 | 2.7 |
| Comparative Example II-2 | PAA | 4,000 | 5 | — | — | — | 178 | 156 | 134 | 31.2 |
| Comparative Example II-3 | PAA | 21,000 | 5 | — | — | — | 272 | 255 | 220 | 49.8 |
| Comparative Example II-4 | PAA | 52,000 | 5 | — | — | — | 355 | 321 | 299 | 65.0 |
| Comparative Example II-5 | PAA | 75,000 | 5 | — | — | — | 361 | 337 | 315 | 67.5 |
| Comparative Example II-6 | PAA | 100,000 | 5 | — | — | — | 298 | 271 | 250 | 54.6 |
| Comparative Example II-7 | PAA | 120,000 | 5 | — | — | — | 280 | 259 | 233 | 51.5 |
| Comparative Example II-8 | PAA | 170,000 | 5 | — | — | — | 248 | 220 | 197 | 44.3 |
| Comparative Example II-9 | PAA | 4,000 | 5 | AA/AMPS | 10,000 | 5 | 189 | 160 | 142 | 32.7 |
| Comparative Example II-10 | PAA | 4,000 | 5 | AA/HAPS | 10,000 | 5 | 178 | 160 | 131 | 31.3 |
| Comparative Example II-11 | PAA | 4,000 | 5 | PMAA | 10,000 | 5 | 216 | 231 | 221 | 44.5 |
| Example II-1 | PAA | 21,000 | 5 | PMAA | 10,000 | 5 | 374 | 380 | 378 | 75.5 |
| Example II-2 | PAA | 52,000 | 5 | PMAA | 10,000 | 5 | 475 | 479 | 498 | 96.8 |
| Example II-3 | PAA | 75,000 | 5 | PMAA | 10,000 | 5 | 488 | 499 | 511 | 99.9 |
| Example II-4 | PAA | 100,000 | 5 | PMAA | 10,000 | 5 | 412 | 422 | 424 | 83.9 |
| Example II-5 | PAA | 120,000 | 5 | PMAA | 10,000 | 5 | 405 | 409 | 407 | 81.4 |
| Example II-6 | PAA | 170,000 | 5 | PMAA | 10,000 | 5 | 375 | 378 | 388 | 76.1 |

※ PAA: polyacrylc acid
PMAA: polymethacrylic acid
AA: acrylic acid
AMPS: 2-acrylamido-2-methylpropanesulfonic acid
HAPS: 3-allyloxy-2-hydroxy-1-propanesulfonic acid
AA/AMPS and AA/HAPS are each a mixture with a weight ratio of 80/20.

<Consideration>

The following is found from Table 2.

In Comparative Examples II-2 to II-8, the amount of removed scale decreases with the passage of days. This is because iron scale is further deposited on the scale that has already been deposited and the treatment using the polyacrylic acid alone does not maintain a constant scale removing effect.

Although two polymers are used in a combined manner in Comparative Example II-11, the removing effect is low. In Comparative Examples II-9 and II-10, the removing effect is also low.

In contrast, scale is removed at a constant rate even when the number of days increases in Examples II-1 to II-6. This is because, when the polymethacrylic acid is used in a combined manner, the deposition of iron scale is prevented while at the same time a constant scale removing effect is maintained by the polyacrylic acid having a large weight-average molecular weight.

Test Example III

Examples III-1 to III-6 and Comparative Examples III-1 to III-4

In Test Example II, a test piece (SPCC, 15×50×10 mm, #400 polishing) made of carbon steel was placed to immerse in water in a test boiler can. Synthetic water containing chemicals listed in Table 3 in concentrations listed in Table 3 in the boiler can was supplied under the same conditions as those of Test Example II to perform a confirmatory test for corrosiveness. The pH of the boiler water was adjusted to 11.3.

After the test, the test piece was taken out and derusted. The corrosion rate was determined from calculation formula (1) below.

Corrosion rate (mdd)=corrosion weight loss of test piece (mg)/(surface area of test piece (dm$^2$)×test duration (day)) (1)

Table 3 shows the results.

TABLE 3

| | Scale remover* | | | | | | |
|---|---|---|---|---|---|---|---|
| | Chemical 1 | | | Chemical 2 | | | |
| | Type | Weight-average molecular weight | Concentration of chemical (mg/L) | Type | Weight-average molecular weight | Concentration of chemical (mg/L) | pH | Corrosion rate (mdd) |
| Example III-1 | PAA | 21,000 | 250 | PMAA | 10,000 | 250 | 11.3 | 21 |
| Example III-2 | PAA | 52,000 | 250 | PMAA | 10,000 | 250 | 11.3 | 16 |
| Example III-3 | PAA | 75,000 | 250 | PMAA | 10,000 | 250 | 11.3 | 17 |
| Example III-4 | PAA | 100,000 | 250 | PMAA | 10,000 | 250 | 11.3 | 18 |
| Example III-5 | PAA | 120,000 | 250 | PMAA | 10,000 | 250 | 11.3 | 18 |
| Example III-6 | PAA | 170,000 | 250 | PMAA | 10,000 | 250 | 11.3 | 20 |
| Comparative Example III-1 | EDTA | — | 250 | PMA | 20,000 | 250 | 11.3 | 195 |
| Comparative Example III-2 | EDTA | — | 500 | — | — | — | 11.3 | 325 |
| Comparative Example III-3 | NTA | — | 500 | — | — | — | 11.3 | 274 |
| Comparative Example III-4 | EDTA | — | 250 | — | — | — | 11.3 | 182 |

*PAA: polyacrylic acid
PMAA: polymethacrylic acid
PMA: polymaleic acid
EDTA: ethylenediaminetetraacetic acid
NTA: nitrilotriacetic acid As is clear from the results of Table 3, the corrosion rate is much lower in the treatment that uses the polyacrylic acid and the polymethacrylic acid in a combined manner than in the treatment that uses a chelating agent such as EDTA or NTA. Thus, the treatment that uses the polyacrylic acid and the polymethacrylic acid in a combined manner has a corrosion inhibiting effect.

The present invention has been described in detail using particular embodiments. However, it is obvious for those skilled in the art that various modifications can be made without departing from the intention and scope of the present invention.

This application is based on Japanese Patent Application No. 2014-025459 filed Feb. 13, 2014, the entire contents of which are incorporated herein by reference.

The invention claimed is:

1. A method for removing scale deposited in a system of a steam generating facility, the method comprising:
adding polyacrylic acid and/or a salt of the polyacrylic acid having a weight-average molecular weight of more than 20,000 to 170,000 to water in the steam generating facility or feed water of the steam generating facility; and
adding polymethacrylic acid and/or a salt of the polymethacrylic acid having a weight-average molecular weight of more than 1,000 to 100,000 to the water in the steam generating facility or the feed water of the steam generating facility,
wherein the feed water of the steam generating facility contains iron,
the polyacrylic acid and/or the salt of the polyacrylic acid is added so that a concentration of the polyacrylic acid and/or the salt of the polyacrylic acid in water of a steam generating unit in the steam generating facility is 5 to 500 mg/L, and
the polymethacrylic acid and/or the salt of the polymethacrylic acid is added so that a concentration of the polymethacrylic acid and/or the salt of the polymethacrylic acid in the water of the steam generating unit in the steam generating facility is 5 to 500 mg/L.

2. The method for removing scale in a steam generating facility according to claim 1, wherein the polyacrylic acid and/or the salt of the polyacrylic acid and the polymethacrylic acid and/or the salt of the polymethacrylic acid are added so that a weight concentration ratio of the polyacrylic acid and/or the salt of the polyacrylic acid to the polymethacrylic acid and/or the salt of the polymethacrylic acid in the water of the steam generating unit in the steam generating facility is 1:100 to 100:1.

3. The method for removing scale in a steam generating facility according to claim 1, wherein a concentration of the iron in the feed water is more than 0.3 mg/L.

4. The method for removing scale in a steam generating facility according to claim 1, wherein the polyacrylic acid and/or the salt of the polyacrylic acid is added so that the concentration of the polyacrylic acid and/or the salt of the polyacrylic acid in the water of the steam generating unit in the steam generating facility is 10 to 500 mg/L, and
the polymethacrylic acid and/or the salt of the polymethacrylic acid is added so that the concentration of the polymethacrylic acid and/or the salt of the polymethacrylic acid in the water of the steam generating unit in the steam generating facility is 10 to 500 mg/L.

5. The method for removing scale in a steam generating facility according to claim 1, wherein the weight-average molecular weight of the polymethacrylic acid and/or the salt of the polymethacrylic acid is 5,000 and 60,000.

6. The method for removing scale in a steam generating facility according to claim 1, wherein the polyacrylic acid and/or the salt of the polyacrylic acid and the polymethacrylic acid and/or the salt of the polymethacrylic acid are added so that the weight concentration ratio of the polyacrylic acid and/or the salt of the polyacrylic acid to the polymethacrylic acid and/or the salt of the polymethacrylic acid in the water of the steam generating unit in the steam generating facility is 1:50 to 10:1.

* * * * *